Jan. 10, 1967  A. B. SEGUR  3,296,653
APPARATUS FOR USE IN REMOVING MEAT FROM POULTRY WINGS
Original Filed Sept. 3, 1963  5 Sheets-Sheet 2
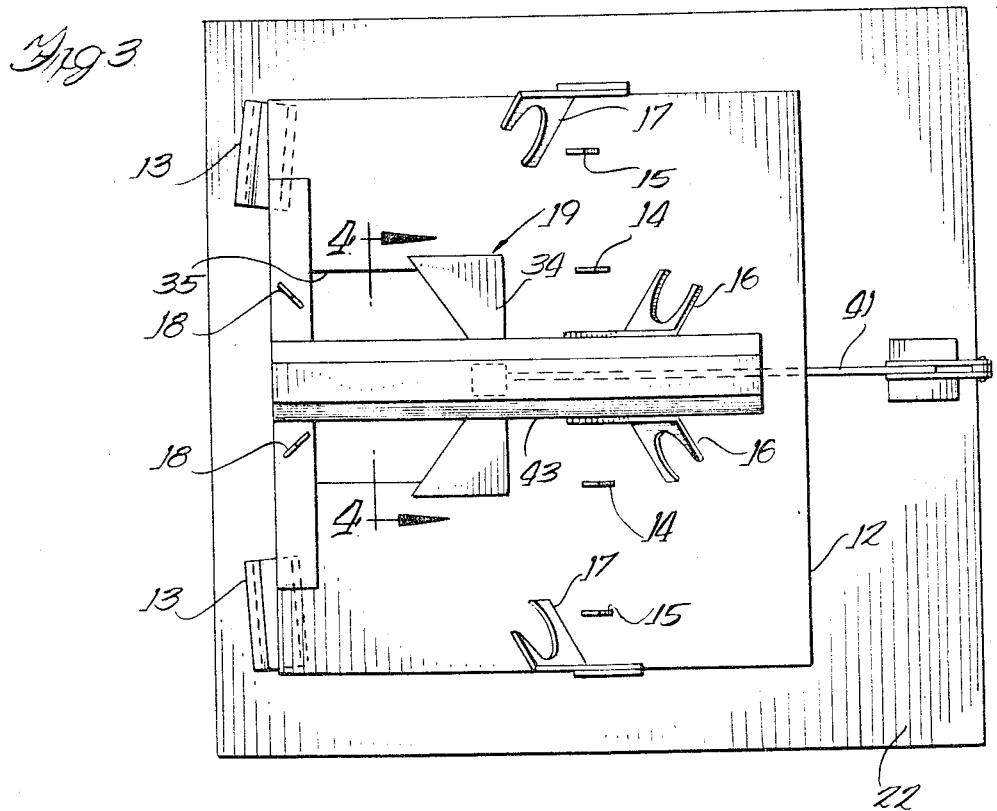
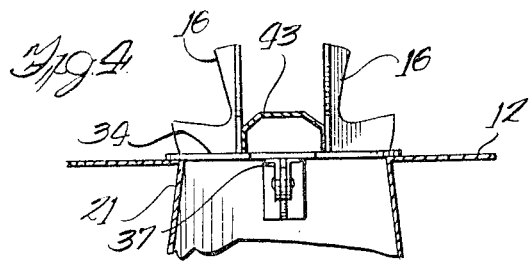
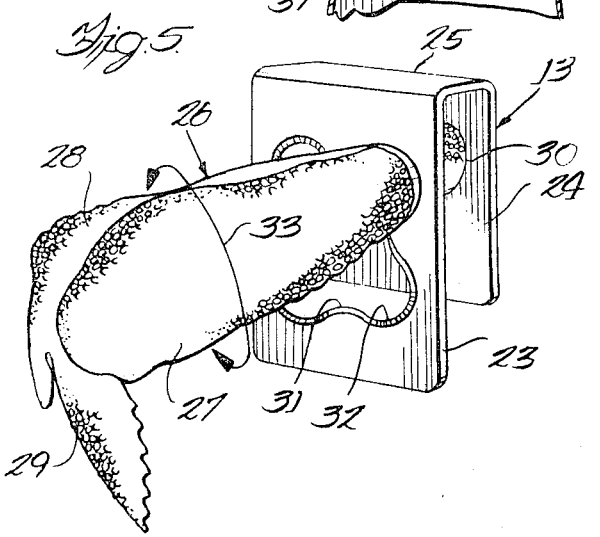

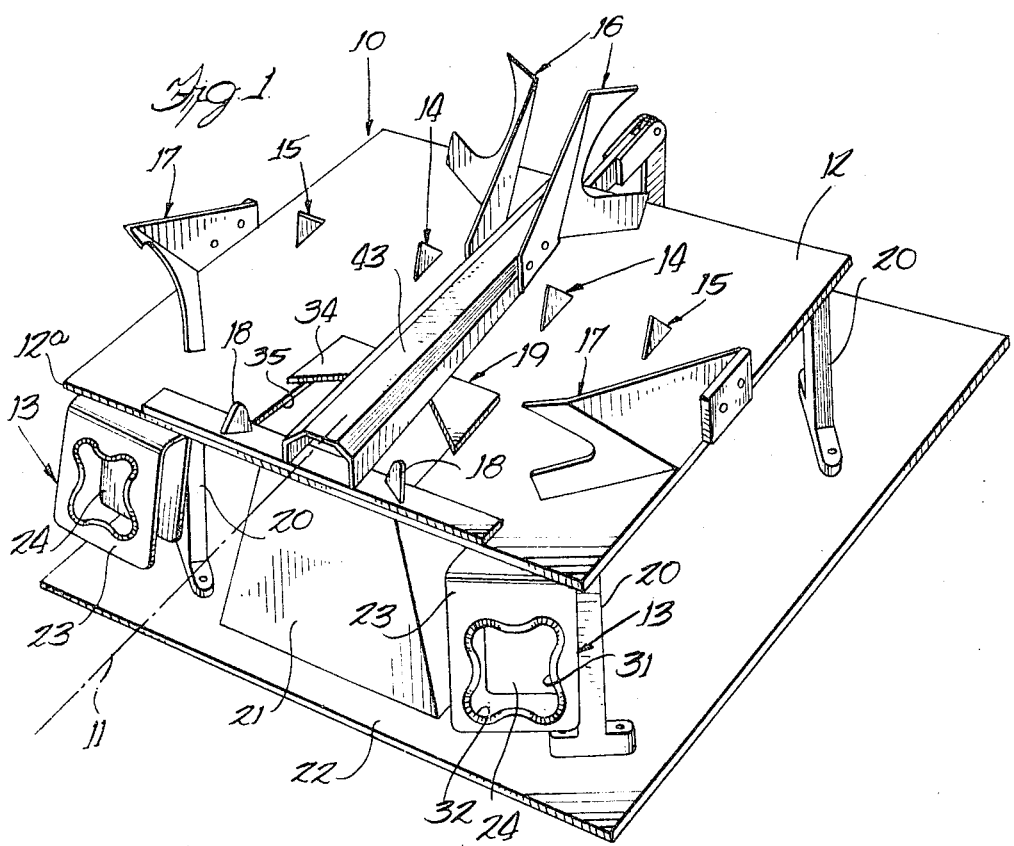

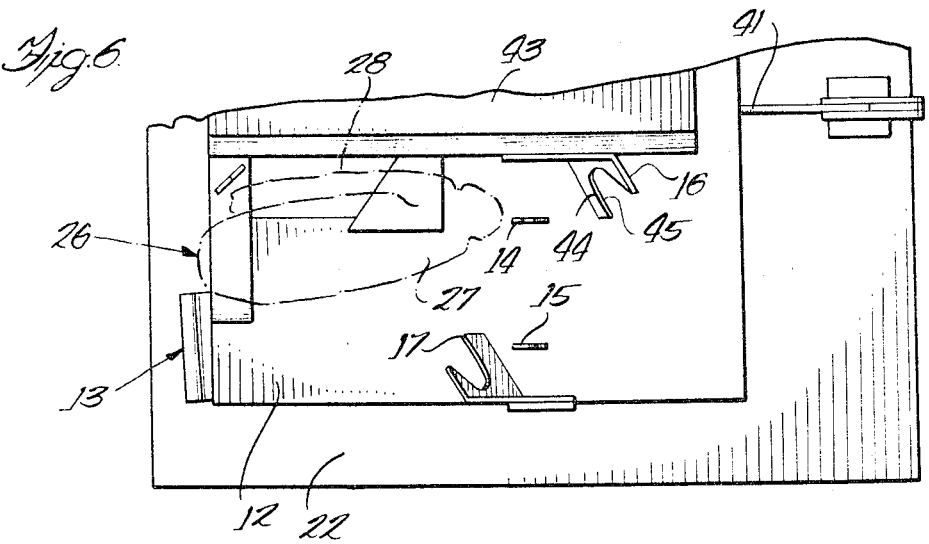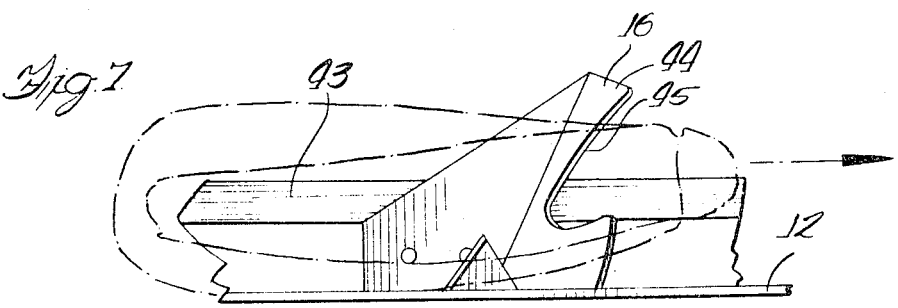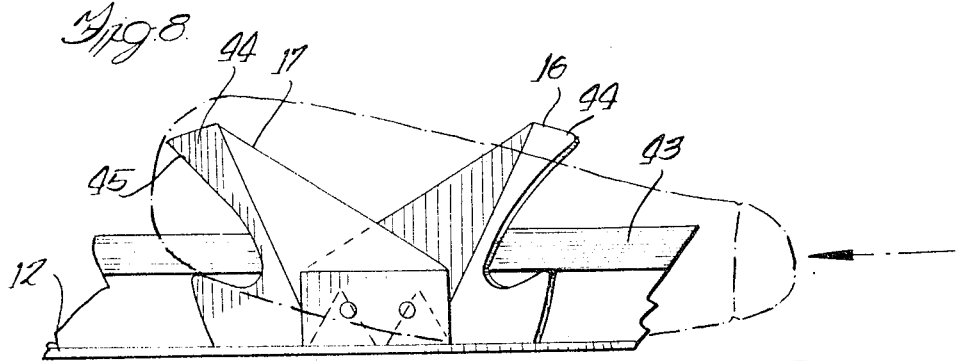

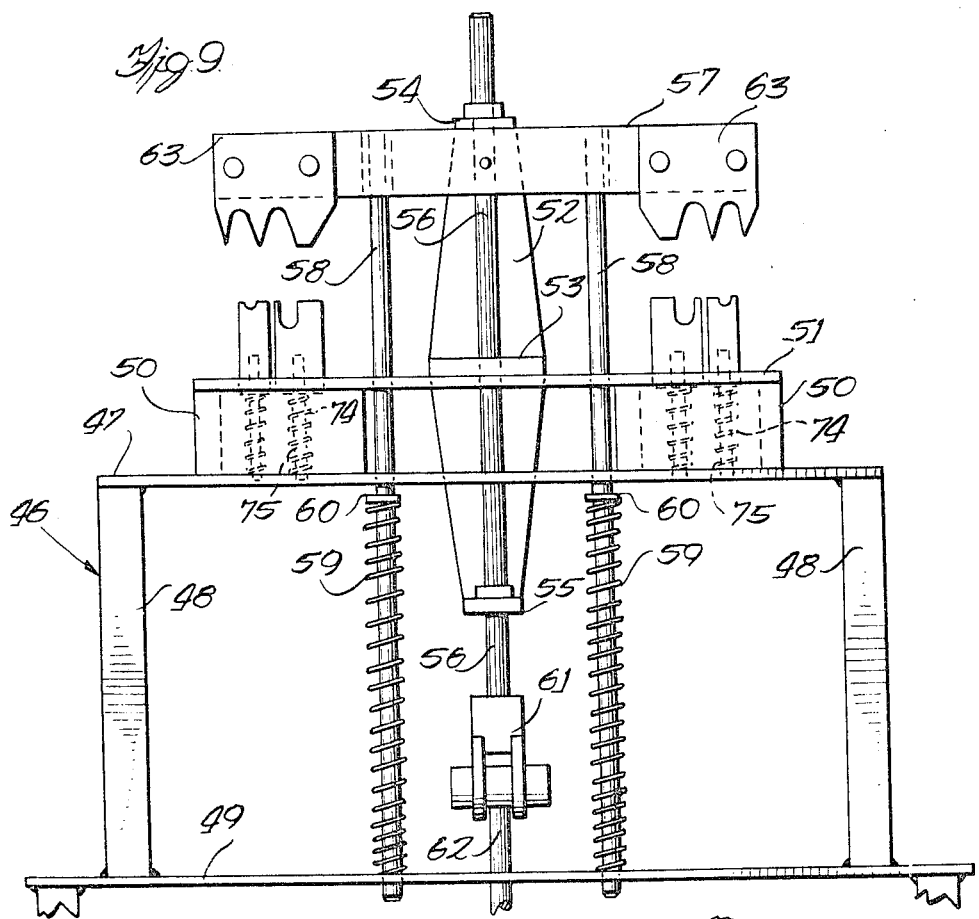
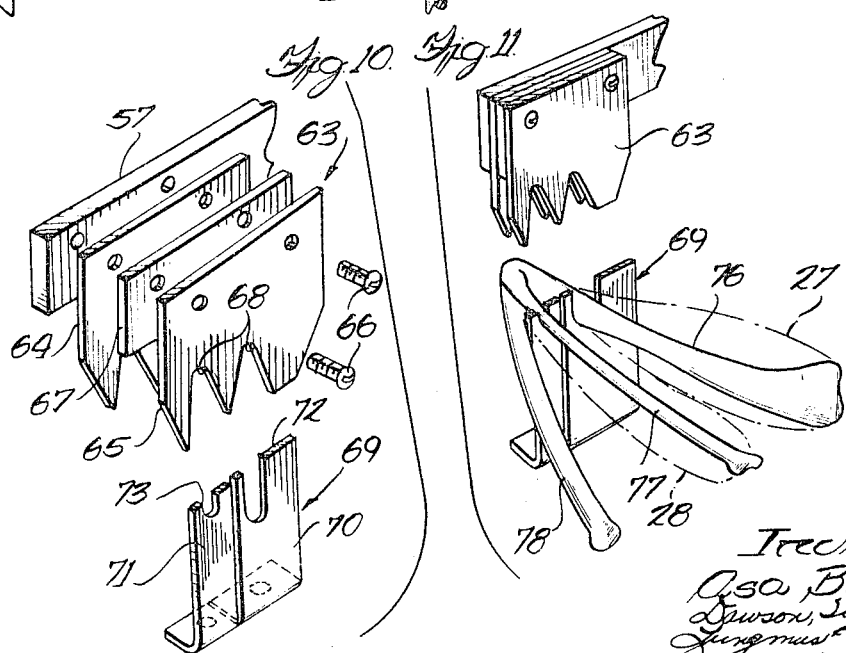

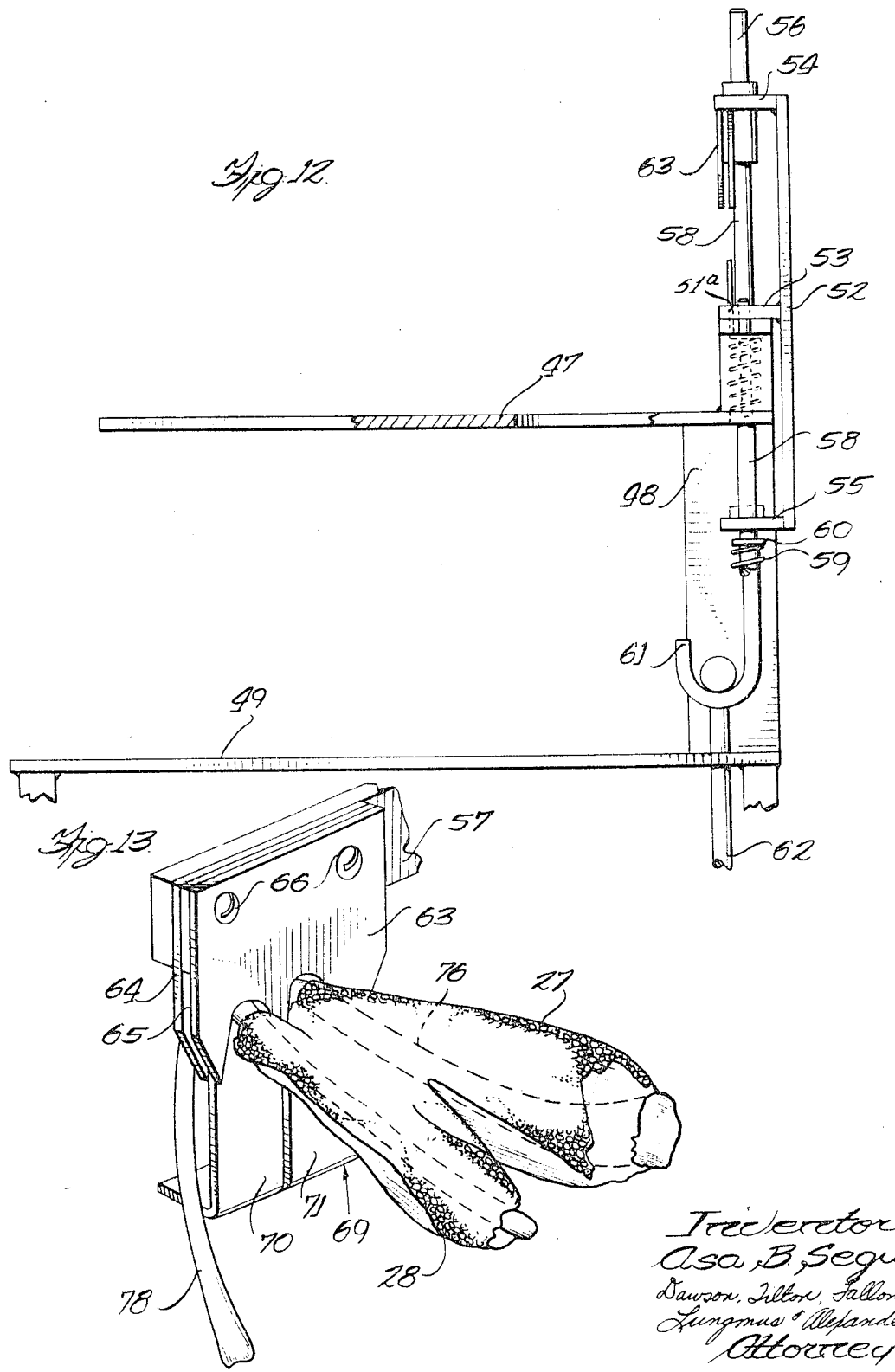

United States Patent Office 3,296,653
Patented Jan. 10, 1967

3,296,653
APPARATUS FOR USE IN REMOVING MEAT
FROM POULTRY WINGS
Asa B. Segur, 1185 S. Ridgeland Ave.,
Oak Park, Ill. 60302
Original application Sept. 3, 1963, Ser. No. 306,042, now
Patent No. 3,233,282, dated Feb. 8, 1966. Divided
and this application Apr. 27, 1965, Ser. No. 451,291
6 Claims. (Cl. 17—11)

This application is a division of my copending application Serial No. 306,042, filed September 3, 1963, entitled Method for Removing Meat From Poultry Wings now Patent No. 3,233,282, issued Feb. 8, 1966.

This invention relates to a meat removal apparatus, and more specifically, to an apparatus intended for use in removing meat from the wing sections of poultry carcasses.

In Patent No. 3,099,858, issued August 6, 1963, I disclose a method and apparatus for dismembering and breaking apart poultry carcasses so that uniformity of procedure and high speed of subsequent meat removal may be readily achieved. In the break-apart operation, a poultry carcass is securely clamped in position and its appendages are then removed therefrom. While the method and apparatus of the present application may be used in conjunction with poultry wing sections removed by other means and methods, it should be mentioned at the outset that this invention is particularly suitable for the removal of meat from poultry wings which have been broken away from carcasses in the manner taught in the aforementioned patent.

An important object of the present invention is to provide an apparatus for use in efficiently and rapidy removing the skin and meat from the jointed wing sections of poultry carcasses, such apparatus being especially submitted for use in commercial poultry processing plants where meat is removed from poultry carcasses for later use in the preparation of soups, meat pies, frozen dinners, and the like. Another object is to provide an apparatus for use in quickly and easily removing first the skin and then the meat from wing sections of poultry carcasses, such steps being carried out successively and without intermingling of the skin and meat removed from the sections. In this connection, it is a specific object to provide an apparatus for use in removing meat from poultry wings without having such meat contaminated and thereby down-graded by the inclusion therewith of skin, cartilage, bones and tendons.

A further object of the present invention is to provide an apparatus for use in separating the bones of poultry wing sections, and in efficiently removing the meat therefrom, without cutting or breaking of the bones, and therefore, without danger of contaminating the removed meat with bone or cartilage fragments. A still further object of the present invention is to provide an efficient apparatus whereby an operator may quickly and easily remove meat from a poultry wing by using only one hand or, by using both hands, may remove meat from two poultry wings at the same time.

Other objects will appear from the specification and drawings in which:

FIGURE 1 is a perspective view illustrating a part of the apparatus of the present invention;

FIGURE 2 is a side elevational view, shown partly in section, of the fixture illustrated in FIGURE 1;

FIGURE 3 is a top plan view of the fixture of FIGURES 1 and 2;

FIGURE 4 is a sectional view taken along line 4—4 of FIGURE 3;

FIGURE 5 is an enlarged perspective view of a skin cutting device constituting part of the fixture of FIGURES 1-4, such device being illustrated in the operation of cutting the skin of a poultry wing section;

FIGURE 6 is a fragmentary top plan view of the fixture illustrating the step of slicing and plowing skin from the radius and ulna;

FIGURE 7 is an enlarged side sectional view of the first skin plowing and slicing step;

FIGURE 8 is an enlarged side sectional view illustrating a second skin slicing and plowing step wherein skin is loosened from the humerus;

FIGURE 9 is a front elevational view of a clamping fixture which constitutes a second part of the apparatus of the present invention;

FIGURE 10 is an enlarged and exploded perspective view illustrating structural details of a set of clamping jaws;

FIGURE 11 is a fragmentary side elevational view of a set of clamping jaws illustrating the relationship between a wing section and the jaws when such jaws are open;

FIGURE 12 is an enlarged side elevational view of the fixture partially broken away and shown partly in section to illustrate the jaw mounting and jaw actuating structure;

FIGURE 13 is a still further enlarged perspective view showing the jaws clamped upon a poultry wing section.

Referring to FIGURES 1-3 of the drawings, the numeral 10 generally designates a fixture for use in slicing and loosening the skin of poultry wings and in detaching the tips of the wings. The fixture is intended for manual use in performing identical operations on two poultry wings at the same time. Therefore, the fixture is symmetrical with respect to a vertical plane passing through midline 11 and the parts on opposite sides of the midline are formed as mirror images of each other.

The fixture consists essentially of a platform 12 supporting a pair of depending skin cutters 13 and being provided with upstanding slicing blades 14 and 15, plows 16 and 17, prying elements 18, and a tip-separating mechanism 19. All of these parts—in fact the fixture as a whole—are preferably formed of stainless steel or some other similar material which is strong, durable, rust-resistant, and otherwise suitable for use in contact with food.

Platform 12 is supported by legs 20 and by central column 21, the legs and column resting in turn upon a suport plate 22. The support plate may, if desired, be part of a table top and should be at normal table-top elevation (i.e., 27 to 32 inches) when the fixture is to be used by a worker in a standing position.

The skin cutting devices 13 are illustrated most clearly in FIGURES 1 and 5. Each consists essentially of an inverted U-shaped member having spaced front and rear plates 23 and 24 respectively. The two plates are bridged by an intermediate horizontal portion 25 which is welded or otherwise rigidly secured to the undersurface of platform 12 adjacent the rear edge 12a thereof.

The structure of each slicing device 13 may best be understood in terms of the function it is intended to perform. The purpose of the slicing device is to slice the skin circumferentially about the elbow of a poultry wing 26 (FIGURE 5). Each poultry wing consists of an upper wing section 27 (containing the humerus), a lower wing section 28 (containing the radius and ulna) and a tip 29 (containing the carpals, carpometacarpals, and phalanges). In the normal state in which such wings are processed, the wings are flexed at the elbow joints 30 with the upper and lower wing sections 27 and 28 forming an acute angle at that joint. The tip 29 ordinarily assumes a generally right-angled relationship with respect to the lower wing section 28, as indicated in FIGURE 5.

The front plate 23 of the skin-cutting device 13 is provided with an opening 31 which has a central portion substantially larger than the cross sectional dimensions of the combined upper and lower wing sections adjacent elbow joint 30. However, opening 31 is of non-circular shape and is provided with one or more arcuate portions 32, four such portions being provided by the embodiment illustrated in the drawings. The diameter of each of the generally semi-circular portions 32 is slightly less than the cross sectional dimensions of the upper and lower wing sections adjacent elbow joint 30 thereof. Therefore, the elbow joint may be readily inserted into the opening 31 through the central portion thereof and, upon shifting of the jointed portion into one of the smaller portions 32 of the opening and upon rotation of the wing as indicated by arrow 33, the sharpened edges defining the opening will circumferentially slice the skin adjacent joint 30.

Rear plate 24 serves as a stop to limit the extent of insertion of a wing into opening 31. The spacing between plates 23 and 24 is such that an elbow joint is disposed entirely between the plates when the joint engages rear plate 24. In the case of chicken wings, it has been found that a spacing of approximately one inch is satisfactory.

The tip-separating mechanism 19 essentially comprises a separating blade 34 movable forwardly and rearwardly along the midline 11 of the platform and in a horizontal direction over platform opening 35, the blade being manually shiftable between its normal forward position and its operative rearward position by means of a foot pedal 36 linked to depending connector 37 by means of links 38, 39, 40 and 41. A spring 42 (FIGURE 2) extends between link 40 and a mounting pin 42a beneath platform 12 and urges the blade into the forward position shown in FIGURES 1 and 2.

The wing-engaging edges of the blade 34 on opposite sides of partition 43 slope inwardly and forwardly with respect to the center line 11 of the unit. The portions of the opening 35 on each side of the partition communicate with the interior of hollow column 21, the column being open at its bottom so that wing sections pryed apart by the blade 34 may drop downwardly through the column and be collected in suitable pans (not shown) disposed beneath platform 12.

The prying elements 18 are rigidly mounted upon the platform on opposite sides of partition 43 and between the lateral portions of opening 35 and the platform's rear edge 12a. Each element is fin-shaped; that is, when viewed in horizontal section it has one long and one narrow dimension. Preferably, the free edge of each element is arcuate and may, if desired, be sharpened although such sharpening is not essential and may in some instances even be undesirable.

Blades 14 and 15 also project upwardly from the platform but, unlike prying elements 18, it is essential that such blades have at least one sharpened cutting edge. Specifically, blades 14 should have their rearwardly-facing edges sharpened whereas blades 15 should have their forwardly-facing edges sharpened. The upstanding blades extend along vertical planes parallel with midline 11 and, in the illustration given, are generally triangular in shape.

Plowing devices 16 and 17 are associated with blades 14 and 15 and project upwardly from the platform upon which they are rigidly mounted. The two plowing devices 16 and 17 on each side of the fixture's midline 11 are identical in configuration, the only difference being their placement and direction. Each device consists of an upstanding plate having a wing portion 44 provided with a generally semi-elliptical recess 45 extending inwardly from its free side edge. Device 16 is mounted with its recess in front of blade 14 and with wing portion 44 extending forwardly and outwardly with respect to the midline 11. Device 17, on the other hand, is oriented with its recess behind blade 15 and with its wing portion extending inwardly and rearwardly. It will also be noted that the wing portions do not extend along vertical planes but instead slope away from the blades with which they are associated at an angle within the range of approximately 20 to 30 degrees.

FIGURES 9 through 13 illustrate the clamping fixture for holding the wings in place as skin and meat are removed therefrom. The clamping fixture is designated generally by the numeral 46 and comprises a platform 47 having legs 48 secured at their lower ends to support plate 49. Like the support plate of fixture 10, plate 49 may be a table top and, in any case, is intended to be suitably mounted at table-top elevation if fixture 46 is to be used by a worker in a standing position.

Above platform 47, and affixed thereto by means of upstanding support members 50, is a horizontally elongated mounting member 51. A vertically elongated guide 52 has a rearwardly extending portion 53 secured to mounting member 51 and rigidly securing the parts together. At its upper and lower ends, the guide member 52 is provided with apertured rearwardly-extending ears 54 and 55 which slidably receive a vertical shaft 56.

Connected to the upper end of the shaft directly below ear 54 is a horizontal jaw-supporting bar 57. Guide rods 58 have their upper ends secured to the jaw-support bar 57 and extend downwardly through mounting member 51, platform 47 and support plate 49 for guiding vertical movement of the jaw-support bar. Compression springs 59 extend about the lower portions of the guide bars 58 and bear upwardly against enlargements 60 of the rods to urge the jaw-supporting bar 57 into the normally raised position illustrated in FIGURES 9 and 12.

The jaw-support bar 57 is lowered by downward force applied to the central rod 56 shown in FIGURES 9 and 12. Rod 56 is provided with a hook 61 at the lower end thereof. This hook is adapted to connect with a rod 62 leading to a suitable foot pedal assembly so that when the foot pedal is depressed rods 62 and 56 will be moved downwardly to shift the paw-support bar 57 into its lowered position.

At opposite ends of the horizontal jaw-mounting bar 57 are a pair of upper jaws 63. Referring to FIGURE 10, it will be observed that each upper jaw consists of a pair of identical vertical plates 64 and 65 secured by screws 66 to opposite sides of a spacer plate 67 and to the mounting bar 57. Along the lower edges of the plates 64 and 65 are a plurality of teeth defining a pair of arcuate recesses 68. The recesses of the two plates are identical and are in register, as indicated in FIGURE 9.

The lower jaw 69 comprises a pair of L-shaped plates 70 and 71, each plate being provided along its upper edge with a recess 72 and 73 in vertical alignment with one of the recesses 68 of the upper jaw. The vertical portions of the lower jaw plates are coplanar with spacer 67 and are receivable between plates 64 and 65 of the upper jaw when the upper jaw is lowered (FIGURE 13).

Each of the lower jaw plates 70 and 71 is slidably received within a slot provided by mounting member 51, as indicated by numeral 51a in FIG. 12. Compression springs 74, extending about shafts 75 between platform 47 and mounting member 51, bear upwardly against the apertured lower ends of jaw plates 70 and 71 and urge those plates into the raised positions illustrated in FIGURES 9 and 12. It will be noted that each of the lower jaw plates is independently sprung, for reasons which will appear shortly.

In the operation of the apparatus, the skin and meat are removed from two poultry wings at the same time, the operator holding one wing in each hand. Since the steps performed on each wing are identical, the removal of skin and meat from only a single wing will now be described.

Holding a right wing in his right hand, the operator inserts the elbow portion of the wing into the opening of the right skin cutting device 13 until the elbow joint engages stop plate 24. After the wing has been urged into one of the arcuate recess portions 32 of opening 31, it is rotated to slice the skin circumferentially about the wing and at a distance of approximately one inch from the end of the elbow joint. Such a slicing action severs the skin of the wing from the small area of skin which extends over the elbow joint and which is secured to a cartilage cap extending over that joint. Such a severing action permits later loosening and removal of the skin of the wing without disturbing the connection between the cartilage cap and the elbow joint directly therebeneath.

Since more than one recess 32 is provided about the opening 31 for each skin cutting device, it is unnecessary to rotate the wing 360 degrees in order to achieve complete slicing of the skin. An operator simply thrusts the wing into the center of opening 31, then rotates it in one direction while the wing is urged into one recess 32, and finally rotates it back in the opposite direction while the wing is disposed in an opposite recess 32. A clean circumferential slicing of the skin is thereby achieved without 360 degree rotation of the wing and without requiring the operator to alter his grip on that wing.

Without changing the position of the wing as it is held in his hand, the operator next places the tip 29 of the wing downwardly into opening 35 on the right side of partition 43, as indicated in FIGURE 2. Foot pedal 36 is then depressed and blade 34 sweeps rearwardly to separate the tip of the wing from the ends of the radius and ulna. This is not a cutting action but is instead a very rapid prying action. The detached tip 29 drops downwardly and is received in a suitable receptacle.

With the wing held in substantially the same position, the radius and ulna of the lower wing section 28 are urged downwardly over prying blade 18 and, with the blade disposed between these bones, the wing is pivoted horizontally about the blade to pry the bones apart, particularly at their free ends. This breaks the free end connection between these bones, but with a prying rather than a slicing or cutting action.

Next the skin is sliced and loosened upon the upper and lower wing sections. This is accomplished by first urging the wing forwardly from the position illustrated in FIGURE 6 so that blade 14 slices the skin along the underside of the lower wing section 28. As the wing rides forwardly over the slicing blade, it engages plowing device 16 and the sliced skin along the lower leg section is plowed laterally and then upwardly by the arcuate edge 45 of the plowing device (FIGURE 7). The operation is then repeated to slice and plow the skin from upper wing section 27. Specifically, the wing, still in substantially the same position with respect to platform 12, is urged rearwardly over cutting blade 15 and against plowing device 17 to slice and plow the skin of upper wing section 27 laterally and upwardly (FIGURE 8). It is to be noted that the skin is not removed at this time; it is simply sliced and loosened to facilitate removal at a later stage.

The wings, with the skin sliced and loosened thereon, are transferred to the clamping fixture illustrated in FIGURES 9 through 13. The humerus 76 of the upper wing section 27 and the radius 77 of the lower wing section 28 are placed within recesses 72 and 73 of the lower jaw plates 70 and 71, as illustrated in FIGURE 11. The ulna 78, which carries practically no meat along its outer edge, is permitted to hang free from the fixture with the meat previously disposed between the radius and ulna clinging to the radius. Jaws 63 and 69 are brought together to clamp the humerus and radius securely therebetween and at a distance of approximately one inch from the elbow joint.

With the wing in clamped position (FIGURE 13), the operator simply pulls the sliced and loosened skin from the wing and places it in a suitable pan. Then, with a twisting action, he loosens and pulls the meat from the clamped bones and places such meat into another pan. The bones are thereby substantially completely cleaned of all skin and meat except for a small flap of skin which may remain connected to the cartilage cap at the elbow joint and which is discarded with the bones after such bones have been released from the clamping jaws.

While in the foregoing I have disclosed the apparatus of the present invention in considerable detail for purposes of illustration, it will be understood by those skilled in the art that many of these details may be varied without departing from the spirit and scope of the invention.

I claim:

1. In an apparatus for removing the skin and meat from poultry appendages, a clamping device having upper and lower jaws comprising parallel vertical plates mounted for relative movement towards and away from each other along separate and adjacent vertical planes, said jaws having a pair of opposing recesses for receiving and clampingly engaging a skeletal component of a poultry appendage extending substantially normal to the planes of said plates to hold said appendage securely in place as meat is stripped therefrom, means operatively associated with one of said jaws for moving the same towards and away from the other of said jaws, and spring means operatively associated with said other of said jaws and urging the same in a direction towards said one of said jaws for limiting the extent of clamping force exertable by said jaws upon a poultry appendage when said jaws are closed.

2. In an apparatus for removing skin and meat from poultry appendages, a clamping device having upper and lower jaws comprising parallel vertical plates, means mounting said upper jaw for vertical movement towards and away from said lower jaw along a plane offset from the plane of said lower jaw, means biasing said upper jaw into a raised open position, and manually-actuatable means associated with said mounting means for urging said upper jaw into a lowered closed position, said jaws each having a pair of opposing recesses for receiving and clampingly receiving a skeletal component of a poultry appendage to hold said appendage securely in place when said jaws are closed, means mounting said lower jaw for limited vertical movement, and spring means urging said lower jaw upwardly to maintain a selected clamping tension on an appendage when said jaws are closed.

3. In an apparatus for removing the meat from poultry wings having upper and lower wing sections, a clamping device having upper and lower jaws comprising parallel vertical plates mounted for relative movement towards and away from each other along separate adjacent vertical plates, said jaws each having a pair of opposing recesses for receiving and clamping the humerus and radius of a poultry wing flexed at its elbow joint for holding said upper and lower wing sections securely in place as meat is stripped therefrom, one of said jaws being resiliently mounted to limit the extent of clamping force exertable by said jaws upon the skeletal components of a poultry wing section.

4. The structure of claim 1 in which one of said jaws includes a pair of spaced vertical plates and the other of said jaws is receivable in the space between the plates of said one paw.

5. The structure of claim 2 in which said means mounting said upper jaw comprises a horizontally elongated support bar, said upper jaw being mounted upon said bar adjacent one end thereof.

6. The structure of claim 5 in which said apparatus includes a second set of substantially identical upper and lower jaws, the upper jaw of said second set being mounted upon said support bar adjacent the end thereof opposite from said one end of said bar, and said manually actuable means being operatively connected to said support bar intermediate the ends thereof.

References Cited by the Examiner

UNITED STATES PATENTS

| | | | |
|---|---|---|---|
| 410,972 | 9/1889 | Houck | 269—157 X |
| 560,715 | 5/1896 | Hofmann | 146—129 |
| 669,585 | 5/1902 | Snediker | 269—157 |

(Other references on following page)

UNITED STATES PATENTS

| | | | |
|---|---|---|---|
| 771,281 | 10/1904 | Smith | 146—129 |
| 1,075,506 | 10/1913 | Smith | 269—157 X |
| 2,247,840 | 7/1941 | Harrison | 30—289 |
| 2,302,943 | 11/1942 | Hazelwood | 269—269 |
| 2,330,382 | 9/1943 | Richards | 269—157 |
| 2,811,742 | 11/1957 | Jackson | 17—11 |
| 2,941,238 | 6/1960 | Reeves | 17—11 |
| 3,038,197 | 6/1962 | Turner | 17—11 |
| 3,063,121 | 11/1962 | Coulter | 24—243 |
| 3,115,667 | 12/1963 | Lis et al. | 17—11 |

SAMUEL KOREN, *Primary Examiner.*

LUCIE H. LAUDENSLAGER, *Examiner.*